US011162860B2

(12) United States Patent
Kachenko et al.

(10) Patent No.: US 11,162,860 B2
(45) Date of Patent: Nov. 2, 2021

(54) VACUUM-RESISTANT PRESSURE SENSING DEVICE

(71) Applicant: Measurement Specialties, Inc., Hampton, VA (US)

(72) Inventors: Natasha V. Kachenko, Palo Alto, CA (US); Jonathan Tran, Milpitas, CA (US)

(73) Assignee: MEASUREMENT SPECIALTIES, INC., Hampton, VA (US)

( * ) Notice: Subject to any disclaimer, the term of this patent is extended or adjusted under 35 U.S.C. 154(b) by 131 days.

(21) Appl. No.: 16/457,879

(22) Filed: Jun. 28, 2019

(65) Prior Publication Data

US 2020/0003649 A1    Jan. 2, 2020

Related U.S. Application Data

(60) Provisional application No. 62/691,065, filed on Jun. 28, 2018.

(51) Int. Cl.
*G01L 9/00* (2006.01)
*G01L 19/06* (2006.01)

(52) U.S. Cl.
CPC ........ *G01L 9/0042* (2013.01); *G01L 19/0645* (2013.01)

(58) Field of Classification Search
CPC ............... G01L 19/0645; G01L 9/0042; G01L 19/0046; G01L 9/0052; G01L 9/0045; G01L 19/0084
See application file for complete search history.

(56) References Cited

U.S. PATENT DOCUMENTS

| 6,311,561 B1 | 11/2001 | Bang et al. |
| 2007/0095146 A1 | 5/2007 | Brosh |
| 2012/0126167 A1* | 5/2012 | Ueki ................. F16H 41/32 252/182.3 |

(Continued)

FOREIGN PATENT DOCUMENTS

DE    102016124024 A1    6/2018

OTHER PUBLICATIONS

"Enparticles"—PFPE Diffusion Pump Oil: https://diffusionpumpoil.com/products/25-9-pfpe-diffusion-pump-oil (Year: 2016).*

(Continued)

*Primary Examiner* — Benjamin R Schmitt

(57) ABSTRACT

A pressure sensing device includes a support structure, an isolated diaphragm, a working oil, and a MEMS die sensing element. The support structure defines a portion of a sealed cavity. The isolated diaphragm is mounted to the support structure. The isolated diaphragm has in inner side that defines an end of the sealed cavity and an outer side opposite the inner side. The working oil is contained within the sealed cavity. The MEMS die sensing element is enclosed within the support structure. The MEMS die sensing element is exposed to the working oil within the sealed cavity. A pressure exerted on the outer side of the isolated diaphragm by a fluid medium is transferred via the working oil to the MEMS die sensing element to measure the pressure of the fluid medium. The working oil has a low vapor pressure and a low volatility content.

20 Claims, 3 Drawing Sheets

(56) References Cited

U.S. PATENT DOCUMENTS

2015/0247774 A1* 9/2015 Wagner .................... G01F 1/34
324/691
2017/0131169 A1* 5/2017 Takimoto ............ G01L 19/0645
2017/0362083 A1 12/2017 Yee et al.
2018/0134545 A1 5/2018 Morsink et al.

OTHER PUBLICATIONS

"Gelest"—Silicone Fluids: Stable, Inert Media (Year: 2012).*
International Search Report, International Application No. PCT/IB2019/052673, International Filing Date Apr. 1, 2019.

* cited by examiner

VACUUM-RESISTANT PRESSURE SENSING DEVICE

CROSS-REFERENCE TO RELATED APPLICATIONS

This application claims the benefit of U.S. Provisional Application No. 62/691,065 filed Jun. 28, 2018, which application is herein incorporated by reference in its entirety.

BACKGROUND OF THE INVENTION

The subject matter herein relates generally to pressure sensing devices for measuring the pressure of fluid media, and more specifically to pressure sensing devices capable of operating within high vacuum environments Pressure sensors or transducers are devices that convert pressure forces into electrical signals that can be interpreted to measure the pressure exerted on the pressure sensor. Some known pressure sensors incorporate micro-electro-mechanical system (MEMS) technology which allows the pressure sensors to have a small, compact size while maintaining high accuracy. However, when exposed to high vacuum conditions for extended periods of time, the accuracy of the pressure sensors suffers. For example, it has been observed that when known pressure sensors are exposed to high vacuum (e.g., very low pressure) and high temperature conditions (e.g., 0.001 Pa pressures and 90 degrees C.), the pressure sensors experience an output shift that affects the measurement readings. The extent of the output shift and time before the output shift occurs varies, which makes it difficult to calibrate or accommodate the output shift. Furthermore, in high vacuum conditions, the construction and composition of known pressure sensors may also suffer.

A need remains for a pressure sensing device that can operate within high vacuum environments without experiencing an output shift that exceeds a designated tolerance threshold or range to provide accurate pressure measurements.

BRIEF DESCRIPTION OF THE INVENTION

In one or more embodiments of the present disclosure, a pressure sensing device is provided that includes a support structure, an isolated diaphragm, a working oil, and a MEMS die sensing element. The support structure defines a portion of a sealed cavity. The isolated diaphragm is mounted to the support structure. The isolated diaphragm has in inner side that defines an end of the sealed cavity and an outer side opposite the inner side. The working oil is contained within the sealed cavity. The MEMS die sensing element is enclosed within the support structure. The MEMS die sensing element is exposed to the working oil within the sealed cavity. A pressure exerted on the outer side of the isolated diaphragm by a fluid medium is transferred via the working oil to the MEMS die sensing element to measure the pressure of the fluid medium. The working oil has a low vapor pressure and a low volatility content.

DETAILED DESCRIPTION OF THE INVENTION

One or more embodiments presented herein disclose a pressure sensing device that includes a MEMS die sensing element. The MEMS die sensing element is isolated from a fluid medium that is to be measured via an isolated diaphragm and a working oil that transfers energy (e.g., forces) from the isolated diaphragm to the MEMS die sensing element. For example, the fluid medium exerts a pressure on the isolated diaphragm, and a resulting deflection of the isolated diaphragm is transmitted via the working oil within a cavity to the MEMS die sensing element which generates an electrical signal proportional to the force exerted by the fluid medium on the isolated diaphragm. The pressure sensing device is also configured to operate in high vacuum environments, such as at pressures as low as 0.001 Pa or lower. For example, the working oil within the pressure sensing device may have a low vapor pressure and low volatility content to avoid (or at least reduce the extent of) outgassing of the working oil (e.g., releasing vapor bubbles) in high vacuum and high temperature conditions, which alters the pressure exerted on the MEMS die sensing element and causes a shift in the electrical signal that is generated.

Figure 1:
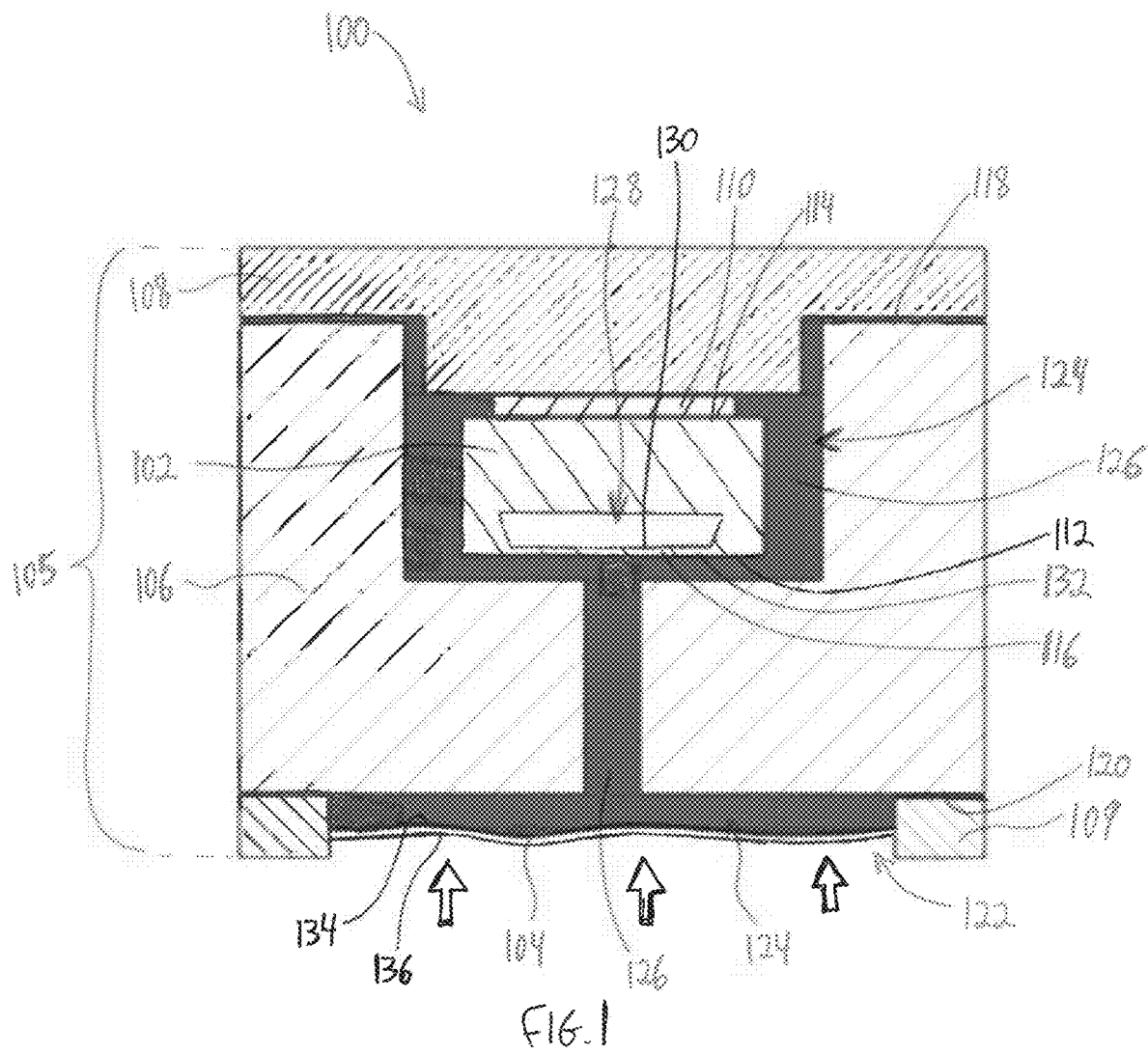
FIG. 1 is a cross-sectional illustration of a pressure sensing device according to an embodiment.

FIG. 1 is a cross-sectional illustration of a pressure sensing device 100 according to an embodiment. The pressure sensing device 100 includes a MEMS die sensing element 102, an isolated diaphragm 104, and a support structure 105. In the illustrated embodiment, the support structure 105 is represented by a housing 106, a header 108, and a port member 109. The MEMS die sensing element 102 (also referred to herein as sensing element 102) is mounted to the header 108 via a bonding layer 110. The bonding layer 110 may be an adhesive, a weld material, or the like. The pressure sensing device 100 according to one or more embodiments is a media isolated pressure sensor. For example, a working oil 126 is sealed inside the pressure sensing device 100 to isolate the MEMS die sensing element 102 from external media that is being measured.

The sensing element 102 has a sensing side 112 and a mounting side 114 opposite the sensing side 112. The mounting side 114 engages the bonding layer 110. The sensing side 112 includes a diaphragm 116. The diaphragm 116 (also referred to as a MEMS diaphragm 116) is thin and is defined by a pocket 128 within the sensing element 102. The MEMS diaphragm 116 includes an interior surface 130 that defines a portion of the pocket 128 and an exterior surface 132 opposite the interior surface 130. The exterior surface 132 defines a portion of the sensing side 112 of the sensing element 102. The sensing element 102 has resistors along the sensing side 112, such as along the exterior surface 132 of the MEMS diaphragm 116. The resistors are piezoelectric and exhibit an electrical resistance that changes based on mechanical strain applied to the sensing element 102. For example, when pressure is applied across the MEMS diaphragm 116, the diaphragm 116 flexes and the resistors that are sensitive to mechanical strain provide an electrical signal through associated circuitry. The electrical signal indicates a measure of the pressure applied across the MEMS diaphragm 116.

The housing 106 has a top side 118 and a bottom side 120 opposite the top side 118. As used herein, relative or spatial terms such as "top," "bottom," "front," "rear," "inner," and "outer" are only used to identify and distinguish the referenced elements in the orientations shown in the illustrated figures and do not necessarily require particular positions or orientations relative to gravity and/or the surrounding environment of the pressure sensing device 100. The housing 106 is disposed between the header 108 and the port member 109. For example, the top side 118 of the housing 106 is mounted to the header 108, and the bottom side 120 of the housing 106 is mounted to the port member 109. The port member 109 may be connected to a conduit or reservoir that contains a fluid medium to be measured by the pressure sensing device 100. The port member 109 defines an opening 122 that receives the fluid medium.

The isolated diaphragm 104 is attached to the port member 109 and extends across the opening 122 to seal the opening 122. The isolated diaphragm 104 may be welded, soldered, brazed, or the like to the port member 109. Optionally, the isolated diaphragm 104 may be attached to the bottom side 120 of the housing 106 in addition to being attached to the port member 109 (or instead of attaching to the port member 109). The fluid medium engages the isolated diaphragm 104, which defines a partition that isolates the sensing element 102 from the fluid medium. The isolated diaphragm 104 has an inner side 134 and an outer side 136 opposite the inner side 134. The inner side 134 faces towards the MEMS die sensing element 102. The fluid medium engages the outer side 136 of the diaphragm 104. The properties of the fluid medium, such as corrosivity and/or conductivity, do not affect the sensing element 102 due to the isolation provided by the isolated diaphragm 104. The isolated diaphragm 104 may include one or more metals, such as stainless steel, nickel, brass, and/or the like.

The pressure sensing device 100 defines a cavity 124 that contains a working oil 126 for transmitting energy (e.g., forces) from the isolated diaphragm 104 to the sensing element 102. The sensing element 102 extends into cavity 124 in the illustrated embodiment such that the sensing side 112 engages the working oil 126. The cavity 124 extends through the housing 106 from the top side 118 to the bottom side 120. The cavity 124 is vertically defined between the header 108 and the isolated diaphragm 104. The cavity 124 is hermetically sealed. The working oil 126 is non-corrosive, non-conductive, and incompressible.

During operation, pressure applied by the fluid medium on the isolated diaphragm 104 within the opening 122 of the port member 109 causes the diaphragm 104 to slightly flex (e.g., deflect). The deflection of the diaphragm 104 is transferred through the working oil 126 to the MEMS diaphragm 116. The pressure on the MEMS diaphragm 116 is detected by measuring the resistance (or a change in the resistance) of the piezo-resistors on the sensing element 102. The pressure sensing device 100 is calibrated to determine the pressure of the fluid medium exerted on the isolated diaphragm 104 based on the measured resistance of the piezo-resistors.

The pressure sensing device 100 is configured to withstand harsh environments including high vacuum and high temperature conditions while maintaining accurate measurements within a designated tolerance threshold or range. For example, the designated tolerance range may be 1% of span at vacuum level. Known pressure sensors experience an output shift greater than the tolerance range when exposed to a high vacuum and high temperature environment for an extended period of time. For example, applying a negative pressure, such as 0.001 Pa, over an extended time period at a high temperature, such as at or above 90° C., causes the tested pressure sensors to experience an output shift. The output shift can exceed 2.5 mV, and it has been observed that greater vacuum conditions and higher temperatures accelerate the output shift. The accuracy of the pressure measurements suffer as a result of the output shift.

The pressure sensing device 100 according to the embodiments presented herein is able to withstand extended exposure to 0.001 Pa pressure and 90° C. temperature without having an output shift greater than 1% span. As a result, the pressure sensing device 100 maintains measurement sensitivity and accuracy even in harsh environments. Due to the robustness of the pressure sensing device 100, the pressure sensing device 100 can be utilized in various harsh environment applications. For example, the pressure sensing device 100 can be utilized in semiconductor manufacturing applications, such as for flash memory production. The pressure sensing device 100 may be installed in a mass flow controller for semiconductor applications.

The working oil 126 of the pressure sensing device 100 has a lower vapor pressure and a lower volatility content (e.g., low concentration of volatile molecules), relative to oils utilized in known pressure sensors. The inventors of the present application have discovered that the composition of the oil within the pressure sensors is a contributing factor in the observed output shift when exposed to high vacuum and high temperature. For example, at high vacuum and high temperature conditions, some of the molecules of the oil transition to the gas phase, creating gas bubbles. The addition of the gas phase within the cavity 124 affects the pressure exerted on the MEMS die sensing element 102, causing or at least contributing to an output shift.

Even if oil is degassed by temperature and moderate vacuum conditioning of the oil prior to entering a known pressure sensor, the conditioning may not remove all volatile molecules that may outgas in high vacuum conditions. The volatility content of the working oil is an inherent material property. Known oils used in typical pressure sensors may have a large amount of volatile content with varying molecular sizes. Small volatile molecules of the oil may outgas during the conditioning process, which allows the oil to maintain the liquid state (e.g., without vapor bubbles) when the pressure sensor is subjected to moderate vacuum and temperature conditions. However, the conditioning process may not generate sufficient energy to cause larger volatile molecules within the oil to outgas, such that the larger volatile molecules remain within the oil. The larger volatile molecules that remain after the conditioning may outgas in high vacuum and high temperature conditions (e.g., pressures at or less than 0.001 Pa and temperatures at or greater than 90° C.), producing the vapor bubbles that contribute to the output shift. The oils used as the working oil 126 of the pressure sensing device 100 according to the embodiments described herein have low vapor pressures and low volatility contents, which eliminates or at least reduces the occurrence of volatile molecules becoming vapors at harsh conditions (e.g., high vacuum and high temperature).

In one embodiment, the working oil 126 is a perfluoropolyether (PFPE) oil. The PFPE oil may have a low vapor pressure that may be less than 13.33 Pa (e.g., 0.1 Torr) at temperatures less than or equal to 100° C. The PFPE oil may have a minimum viscosity of 0.426 Pa*s at 1 rad/s. In non-limiting examples, the PFPE oil may be ECO-25/9 PFPE diffusion pump oil, available from Enparticles Diffusion Pump Oil. Optionally, diffusion pump oils other than PFPE oil may have sufficient properties (e.g., low vapor pressure, low volatility content, inert, etc.) to represent the working oil 126 of the pressure sensing device 100.

In another embodiment, the working oil 126 is a silicone oil that has a volatility content (e.g., volatile molecule count) that is less than $3 \times 10^6$ per 20 µL. For example, the silicone oil representing the working oil 126 may have a volatility content of approximately $2.5 \times 10^6$ per 20 µL. A second silicone oil that is commonly used in known pressure sensors was measured to have a greater volatility content than the other silicone oil, referred to as the first silicone oil. For example, the volatility content of the second silicone oil was measured to be greater than $5 \times 10^6$ per 20 µL, and roughly double the content of the first silicone oil. During testing, the use of the second silicone oil within a pressure sensor resulted in an output shift greater than the designated tolerance range of 1% span, while the use of the first silicone oil (with the lower volatility content) in the pressure sensor did not cause an output shift greater than the tolerance range. Thus, the first silicone oil with the lower volatility content may represent the working oil 126 within the pressure sensing device 100, while the second silicone oil does not represent the working oil 126.

The pressure sensing device 100 containing the working oil 126 according to the embodiments described herein is capable of providing pressure measurements of fluid media at harsh conditions including high vacuum and high temperature without resulting in an output shift greater than a designated tolerance threshold or range. For example, the pressure sensing device 100 has been exposed for prolonged periods of time to a pressure of 0.001 Pa and a temperature of 90° C., while maintaining the output within a tolerance range of 1% of span at vacuum level. The pressure sensing device 100 may be operable at lower pressures (e.g., higher vacuum) and greater temperatures than the tested conditions. The pressure sensing device 100 is able to measure fluid media at pressures between about 1.7 kPa and about 6.9 kPa (about 0.25 psi to about 100 psi). The pressure sensing device 100 is able to measure corrosive and/or conductive fluid media because the MEMS die sensing element 102 is isolated from the fluid media via the isolated diaphragm 104.

Figure 2:
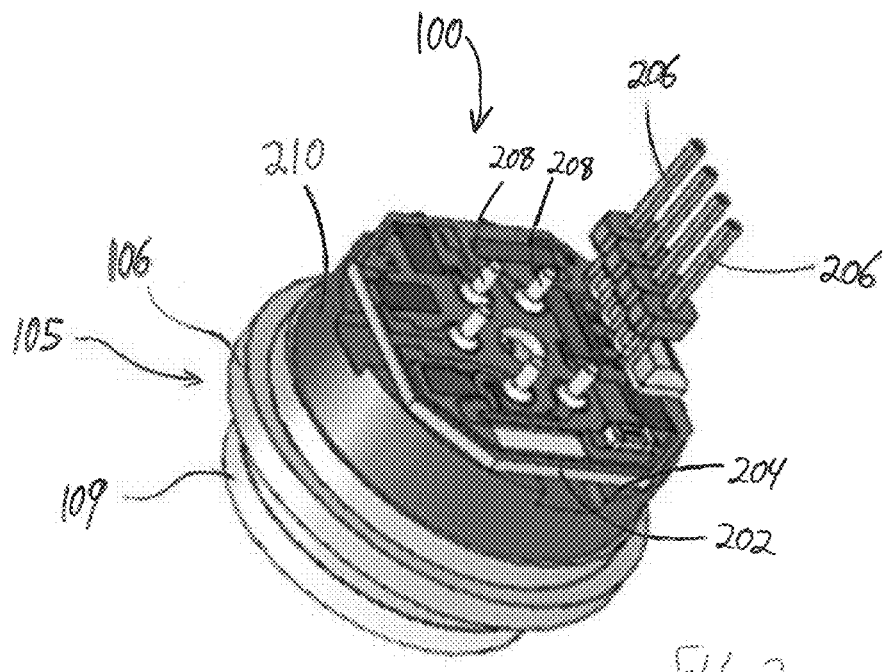
FIG. 2 is a perspective view of the pressure sensing device according to an embodiment.

FIG. 2 is a perspective view of the pressure sensing device 100 according to an embodiment. The support structure 105 of the pressure sensing device 100 includes the housing 106 coupled between the port member 109 and a spacer 210. The header 108 is not shown in FIG. 2. The MEMS die sensing element 102 (shown in FIG. 1) and the working oil 126 (FIG. 1) are contained within the support structure 105 and are not visible in FIG. 2. The pressure sensing device 100 includes metal pins 208 that pass through a spacer 210. The pins 208 are electrically connected to the MEMS die sensing element 102 either directly or via wires. The pressure sensing device 100 includes a circuit board 202 mounted on a top side 204 of the spacer 210. The top side 204 is opposite to the side of the spacer 210 that couples to the housing 106. The pins 208 extend through the circuit board 202. The circuit board 202 includes circuitry that is configured to receive and analyze the electrical signals generated by the piezo-resistors on the sensing element 102. The pressure sensing device 100 includes conductors 206, such as wires or rigid metal contacts, extending from the circuit board 202 to a remote device, such as a communication device, a display device, a control device, and/or a power source.

Figure 3:
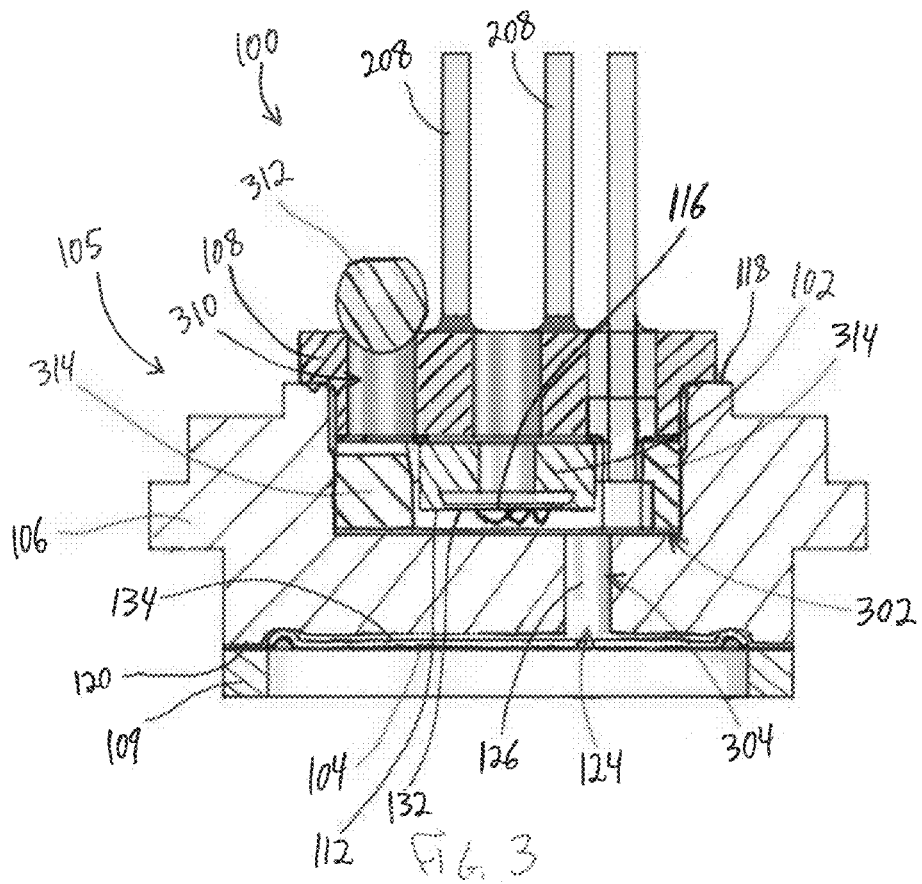
FIG. 3 is a cross-sectional view of the pressure sensing device according to the embodiment shown in FIG. 2.

FIG. 3 is a cross-sectional view of the pressure sensing device 100 according to the embodiment shown in FIG. 2. The pressure sensing device 100 in FIG. 3 may be similar to the illustrated embodiment of the pressure sensing device 100 shown in FIG. 1. The housing 106 defines a recess 302 that is open along the top side 118 of the housing 106 and a channel 304 that is fluidly connected to the recess 302. The channel 304 extends from the recess 302 to the bottom side 120 of the housing 106. The channel 304 has a smaller diameter than the recess 302. Both the recess 302 and the channel 304 define portions of the cavity 124 that receives the working oil 126. The housing 106 includes stainless steel, but may include one or more other metals in an alternative embodiment. The MEMS die sensing element 102 is mounted to the header 108 via an adhesive, such as an epoxy or a room-temperature-vulcanizing (RTV) silicone. The MEMS die sensing element 102 projects into the recess 302 of the housing 106 from above, and the sensing side 112 of the sensing element 102 engages the working oil 126. For example, the exterior surface 132 of the MEMS diaphragm 116 is in contact with the working oil 126. The sensing element 102 may be a silicon chip. The embodiment shown in FIG. 3 is a top-side MEMS die design (as well as the embodiment shown in FIG. 1).

The isolated diaphragm 104 is mounted to the support structure 105 at or proximate to the interface between the housing 106 and the port member 109. The inner side 134 of the isolated diaphragm 104 defines an end of the cavity 124. The cavity 124 is sealed to prevent the ingress or egress of fluids. In the illustrated embodiment, the isolated diaphragm 104 includes stainless steel and nickel alloys, but may include one or more other metals in an alternative embodiment. The support structure 105 and the isolated diaphragm 104 may have a compact size, such that the diameter of the isolated diaphragm 104 may be approximately 12-13 mm (e.g., within 2%, 5%, or 10% thereof), such as 12.57 mm.

The header 108 defines a fill hole 310 therethrough that is open to the cavity 124. The fill hole 310 is used to fill the cavity 124 with the working oil 126. After filling is complete, the fill hole 310 is sealed by a ball seal 312. The ball seal 312 may be metallic, such as stainless steel, and may be sealed on the header 108 via welding, soldering, or the like. The pins 208 project from the header 108 to engage the circuit board 202 (shown in FIG. 2), which is omitted in FIG. 3, to provide an electrical connection between the MEMS die sensing element 102 and processing circuitry.

Optionally, the pressure sensing device 100 includes a ceramic insert 314 mounted to the header 108 and surrounding the MEMS die sensing element 102. The ceramic insert 314 projects into the recess 302 of the housing 106 with the sensing element 102, and engages the working oil 126 in the cavity 124. The pressure sensing device 100 optionally may include a compensation board to compensate the electrical sensor output.

Figure 4:
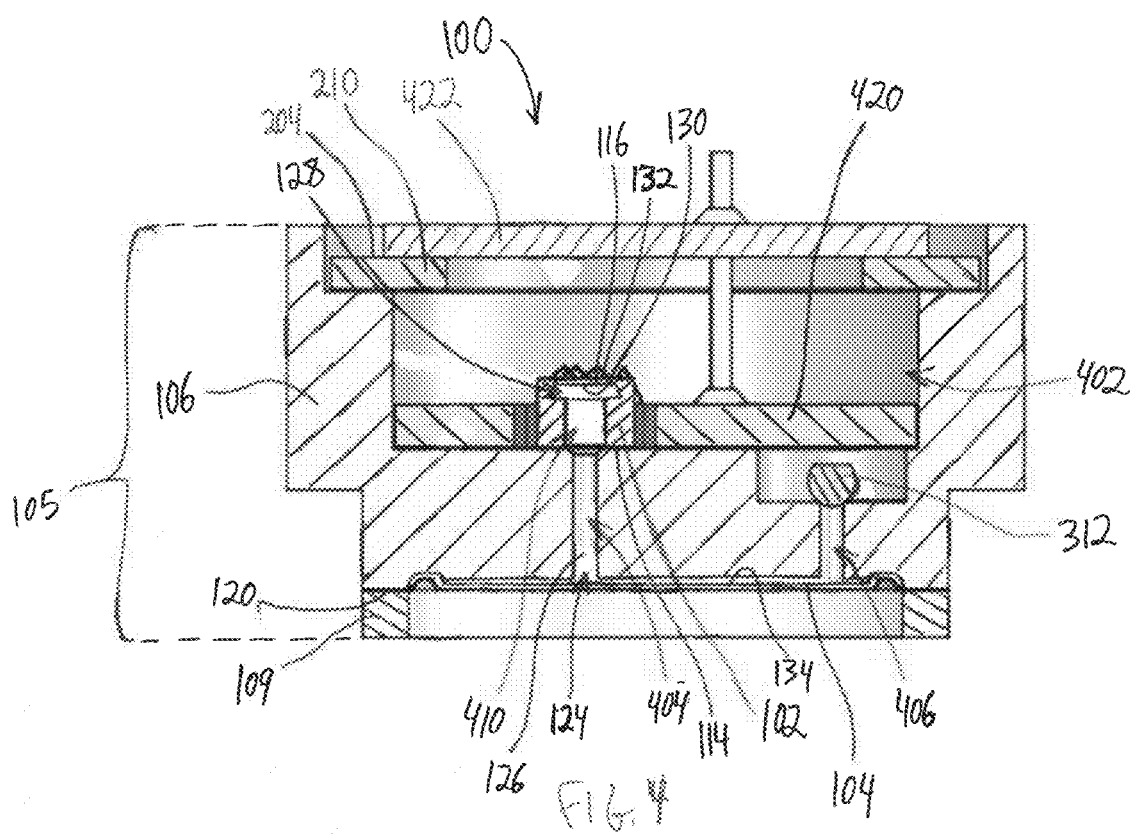
FIG. 4 is a cross-sectional view of the pressure sensing device according to another embodiment.

FIG. 4 is a cross-sectional view of the pressure sensing device 100 according to another embodiment. In the illustrated embodiment, the support structure 105 includes a housing 106, a spacer 210, and a port member 109, similar to FIG. 2. The support structure 105 lacks the header 108 shown in FIGS. 1 and 3. The MEMS die sensing element 102 is mounted to the housing 106. The sensing element 102 is disposed within a recess 402 of the housing 106. Unlike the recess 302 shown in FIG. 3, the recess 402 does not define a portion of the cavity 124 that contains the working oil 126. For example, the housing 106 defines a channel 404 and a fill hole 406 spaced apart from the channel 404. Each of the channel 404 and the fill hole 406 extends from the recess 402 to the bottom side 120 of the housing 106. The channel 404 aligns with and is fluidly connected to an aperture 410 in the mounting side 114 of the MEMS die sensing element 102. The aperture 410 extends from the mounting side 114 to the pocket 128. The fill hole 406 is plugged by a ball seal 312 that is within the recess 402. The cavity 124 that contains the working oil 126 extends from the fill hole 406 along the space between the bottom side 120 of the housing 106 and the inner side 134 of the isolated diaphragm 104 through the channel 404 and into the aperture 410 to the MEMS diaphragm 116 of the sensing element 102.

The working oil 126 engages the interior surface 130 of the MEMS diaphragm 116. The embodiment shown in FIG. 4 is a back-side MEMS die design because the working oil 126 contacts the interior surface 130 instead of the exterior surface 132, as with the top-side MEMS die design shown in FIG. 3. In FIG. 4, the piezo-resistors along the exterior surface 132 of the MEMS diaphragm 116 are outside of the cavity 124 and therefore not exposed to the working oil 126. In the illustrated embodiment, the working oil 126 may be any of the working oils described with respect to the top-side embodiment shown in FIGS. 1 through 3. For example, the working oil 126 has a low vapor pressure and low volatility content.

The MEMS die sensing element 102 extends through, and is electrically connected to, a bond printed circuit board 420. The pressure sensing device 100 optionally includes a compensation board 422 to compensate the electrical sensor output. The compensation board 422 is mounted on the top side 204 of the spacer 210 in the illustrated embodiment, such that the spacer 210 is stacked between the compensation board 422 and the housing 106.

At least one technical effect of the pressure sensing device 100 according to the embodiments presented herein is the ability to maintain sensitivity even when exposed to harsh environments, such as high vacuum and high temperature conditions for extended periods of time. As a result, the pressure sensing device 100 may be employed for use in applications that conventional pressure sensors are not able to withstand, such as in various semiconductor manufacturing applications. Another technical effect of the pressure sensing device 100 is that the pressure sensing device 100 can be utilized to measure the pressure of fluid media that is corrosive and/or conductive without degradation due to the isolation provided by the isolated diaphragm 104. The pressure sensing device 100 has a relatively compact and small size, which also allows the pressure sensing device 100 to be mounted in locations that conventional pressure sensors may not fit, while providing accurate pressure measurements.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A pressure sensing device comprising:
   a support structure defining a portion of a sealed cavity, wherein the support structure comprises a housing, a header connected with a first axial end of the housing, and a port member connected with a second axial end of the housing that is opposite the first axial end;
   an isolated diaphragm mounted to the support structure adjacent the second axial end of the housing, the isolated diaphragm having in inner side that defines an end of the sealed cavity and an outer side opposite the inner side;
   a working oil contained within the sealed cavity; and
   a MEMS die sensing element enclosed within the support structure and disposed within a recess of the housing defined by a wall structure of the housing that extends axially from the first axial end to a base surface, wherein the MEMS die sensing element is attached to the support structure along only a first axial end of the MEMS die sensing element, wherein the MEMS die sensing element includes a second axial end that includes a diaphragm, wherein the MEMS die sensing element second axial end is opposite the MEMS die sensing element first axial end, and wherein the diaphragm is exposed to the working oil within the sealed cavity, wherein the housing comprises a channel disposed axially through a section of the housing extending from the recess base surface to the housing second axial end, wherein the channel is in direct contact with the working oil and extends from a portion of the sealed cavity adjacent the isolated diaphragm to a portion of the sealed cavity adjacent the MEMS die sensing element diaphragm, wherein a pressure exerted on the outer side of the isolated diaphragm by a fluid medium is transferred via the working oil through the channel to the MEMS die sensing element diaphragm to measure the pressure of the fluid medium, wherein the working oil has a low vapor pressure and a low volatility content.

2. The pressure sensing device of claim 1, wherein the working oil is a perfluoropolyether (PFPE) oil.

3. The pressure sensing device of claim 1, wherein the working oil has a vapor pressure less than 13.33 Pa at temperatures less than or equal to 100° C.

4. The pressure sensing device of claim 1, wherein the working oil has a minimum viscosity of 0.426 Pa*s at 1 rad/s.

5. The pressure sensing device of claim 1, wherein the working oil is a silicone oil that has a volatility content less than $3 \times 10^6$ per 20 μL.

6. The pressure sensing device of claim 1, wherein the working oil is a diffusion pump oil.

7. The pressure sensing device of claim 1, wherein the isolated diaphragm has a diameter of approximately 12-13 mm.

8. The pressure sensing device of claim 1, wherein the isolated diaphragm includes stainless steel and nickel alloys.

9. The pressure sensing device of claim 1, wherein the housing is a solid one-piece construction moving radially inwardly between a peripheral side wall surface to the channel and extending between the housing first and second axial ends.

10. The pressure sensing device of claim 1, wherein the MEMS die sensing element diaphragm has an interior surface along a pocket defined within the MEMS die sensing element and an exterior surface opposite the interior surface, wherein the working oil in the sealed cavity engages the exterior surface of the diaphragm, and wherein the MEMs die sensing element first axial end is mounted to the header.

11. The pressure sensing device of claim 1, wherein the MEMS die sensing element has an aperture that extends axially from the MEMS die sensing element first axial end to the MEMS die sensing element diaphragm located at an end of the aperture, wherein the aperture is disposed over the channel such that the working oil in the sealed cavity is in fluid flow communication with the MEMS die sensing element diaphragm.

12. The pressure sensing device of claim 1, wherein the isolated diaphragm connected with the housing second axial end is the only isolated diaphragm of the pressure sensing device.

13. A pressure sensing device comprising:
a support structure comprising a housing having a first axial end and an opposed second axial end;
an isolated diaphragm connected with the support structure adjacent the housing second axial end, wherein the isolated diaphragm has an inner side and an outer side opposite the inner side, wherein a sealed cavity is defined within the support structure between the housing first axial end and the inner side of the isolated diaphragm;
a working oil contained within the sealed cavity; and
a MEMS die sensing element enclosed within a recess in the housing between the first and second axial ends, wherein the MEMS die sensing element is attached to the support structure along only a first axial end of the MEMS die sensing element, wherein the MEMS die sensing element comprises a second axial end opposite the MEMS die sensing element first axial end, wherein the MEMS die sensing element second axial end includes a diaphragm that is exposed to the working oil within the sealed cavity;
wherein the housing comprises a channel extending axially through a section of the housing adjacent the second axial end, wherein the channel is in direct contact with the working oil and extends from a portion of the sealed cavity adjacent the isolated diaphragm to a portion of the sealed cavity adjacent the MEMS die sensing element diaphragm, wherein a pressure exerted on the outer side of the isolated diaphragm by a fluid medium external from the pressure sensor device is transferred via the working oil through the channel to the MEMS die sensing element diaphragm to measure the pressure of the fluid medium, and wherein the working oil has a low vapor pressure and a low volatility content.

14. The pressure sensing device as recited in claim 13, wherein an axial end of the channel located adjacent the MEMS die sensing element is aligned to transfer fluid to the MEMS die sensing element diaphragm, wherein the MEMS die sensing diaphragm is located along an exterior surface of the MEMS die sensing element that is disposed in the sealed cavity, and wherein the MEMS die sensing element first axial end is attached to a header that is attached with the housing first axial end.

15. The pressure sensing device as recited in claim 13, wherein the housing recess comprises a continuous wall structure that surrounds the MEMS die sensing element, and wherein the housing is a solid one-piece construction moving radially inwardly between a housing peripheral side wall surface to the channel and extending between the housing first and second axial ends.

16. The pressure sensing device of claim 13, wherein the MEMS die sensing element comprises an aperture extending axially from the MEMS die sensing element first axial end, wherein the aperture extends to the MEMS die sensing element diaphragm, wherein the MEMS die sensing element is attached to the housing over the channel so that the channel is in axial alignment with the aperture such that the working oil in the sealed cavity transported through the channel engages the MEMS die sensing element diaphragm.

17. A pressure sensing device comprising:
a support structure comprising a housing having a first axial end and an opposed second axial end, wherein a header is connected with the first axial end, and wherein a port member is connected with the second axial end;
an isolated diaphragm connected with the support structure adjacent the housing second axial end, wherein the isolated diaphragm has an inner side and an outer side opposite the inner side, wherein a sealed cavity is defined within the housing between the first axial end and the inner side of the isolated diaphragm;
a working oil contained within the sealed cavity; and
a MEMS die sensing element enclosed within a recess in the housing extending partial distance from the first axial end, wherein the MEMS die sensing element is mounted to the support structure at only one axial end of the MEMS die sensing element, wherein a diaphragm is located along a second axial end of the MEMS die sensing element, and wherein the MEMS die sensing element diaphragm is exposed to the working oil within the sealed cavity;
wherein the housing comprises a channel extending axially from the second axial end through a section of the housing, wherein the channel is in direct contact with the working oil and extends from a portion of the sealed cavity adjacent the isolated diaphragm to a portion of the sealed cavity adjacent and aligned with the MEMS die sensing element diaphragm, wherein a pressure exerted on the outer side of the isolated diaphragm by a fluid medium is transferred via the working oil through the channel to the MEMS die sensing element diaphragm to measure the pressure of the fluid medium, and wherein the working oil has a low vapor pressure and a low volatility content.

18. The pressure sensing device as recited in claim 17, wherein the MEMS die sensing element comprises an aperture extending from the MEMS die sensing element first axial end, wherein the aperture extends to the MEMS die sensing element diaphragm, and wherein the MEMS die sensing element is mounted to the housing over an axial end of the channel immediately adjacent and in alignment with the aperture.

19. The pressure sending device as recited in claim 17, wherein the housing includes a wall structure that completely surrounds the MEMS die sensing element, and wherein the housing is a solid one-piece construction moving radially inwardly between a housing peripheral side wall surface to the channel and extending between the housing first and second axial ends.

20. The pressure sensing device of claim 17, wherein the MEMS die sensing element diaphragm is disposed along an exterior surface of the MEMS die sensing element that is disposed within the sealed cavity and exposed to the working oil, and wherein the MEMS die sensing element first axial end is attached to a header that is connected over the housing first axial end.

* * * * *